INVENTORS
WARREN A. PETRIE
GEORGE R. SMITH

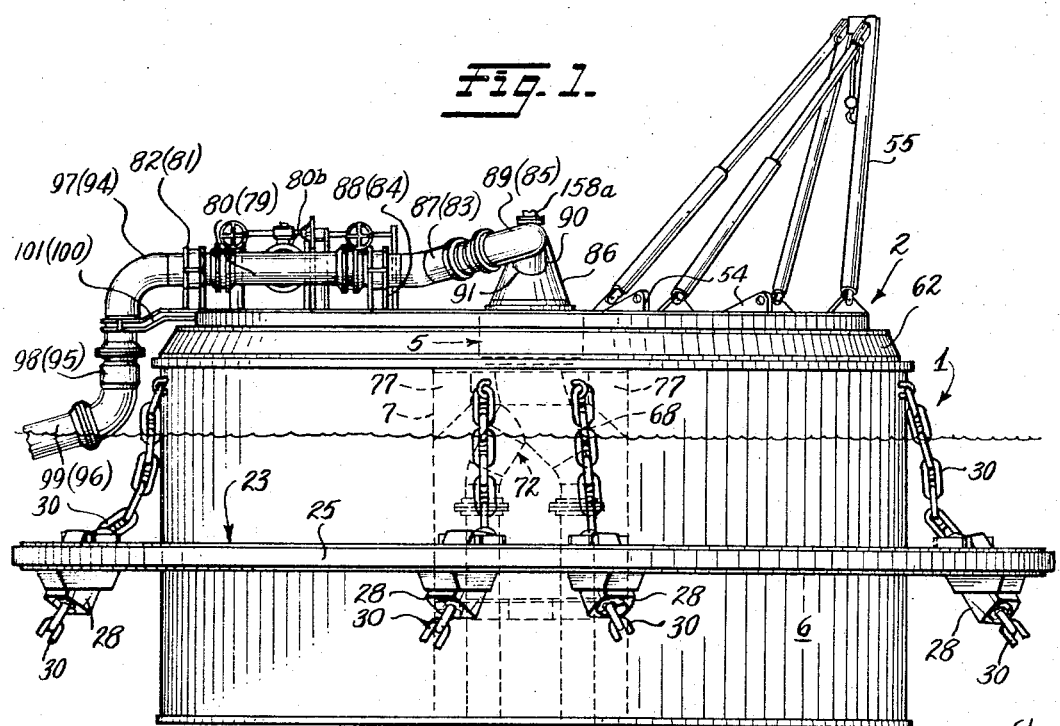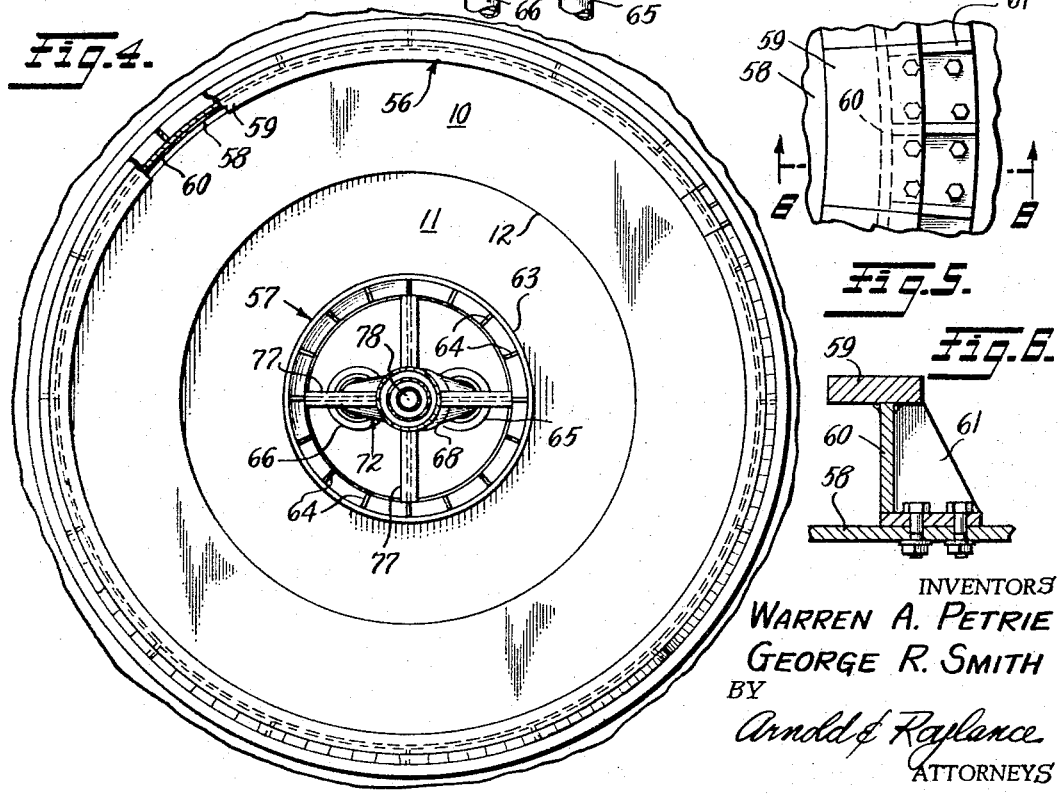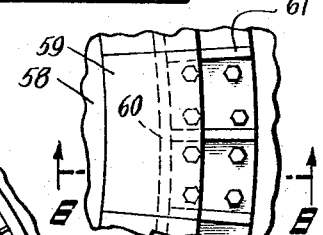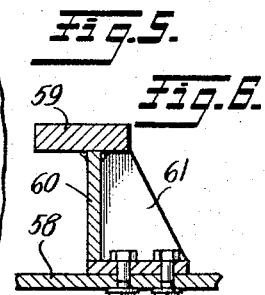

BY Arnold & Raflance

ATTORNEYS

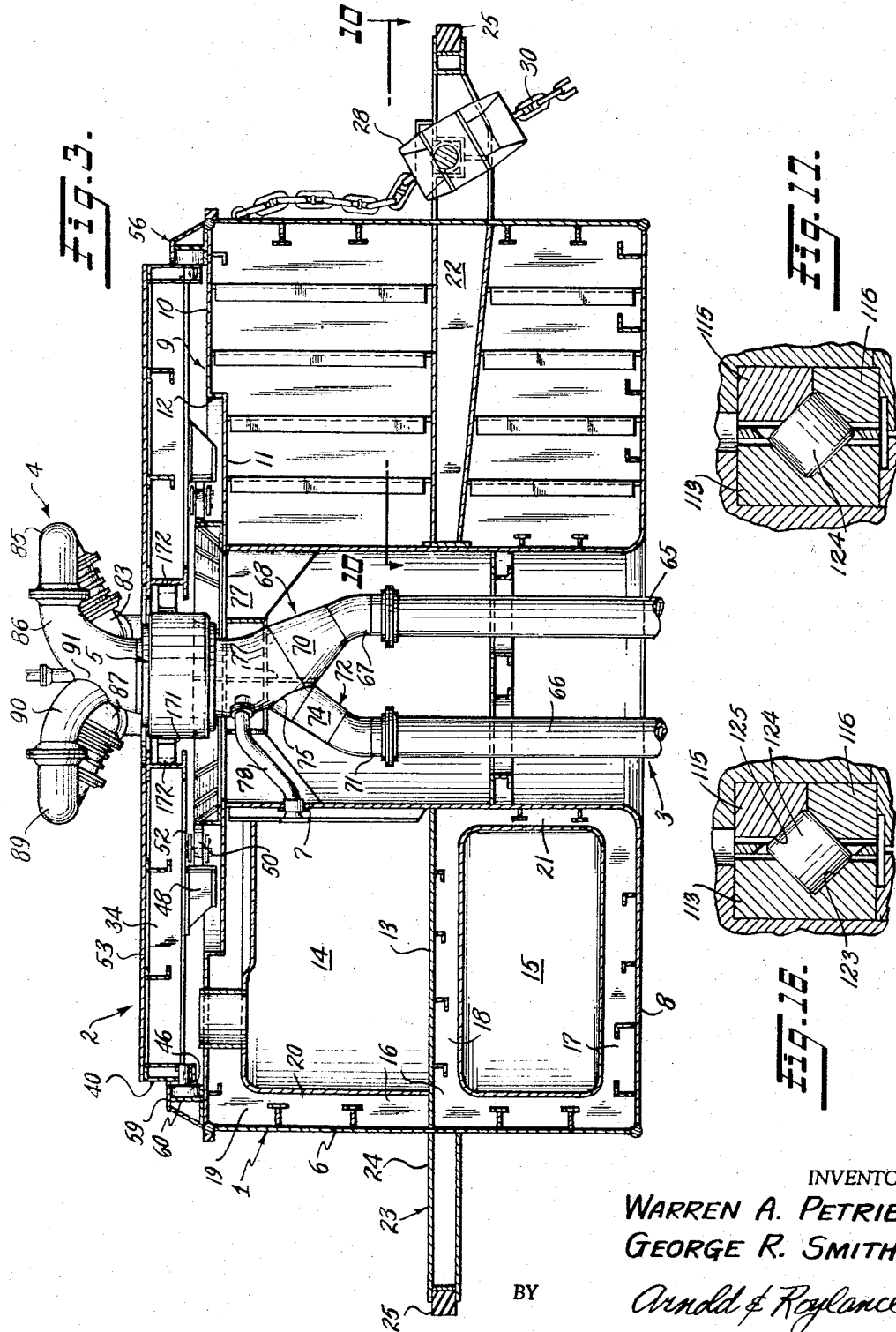

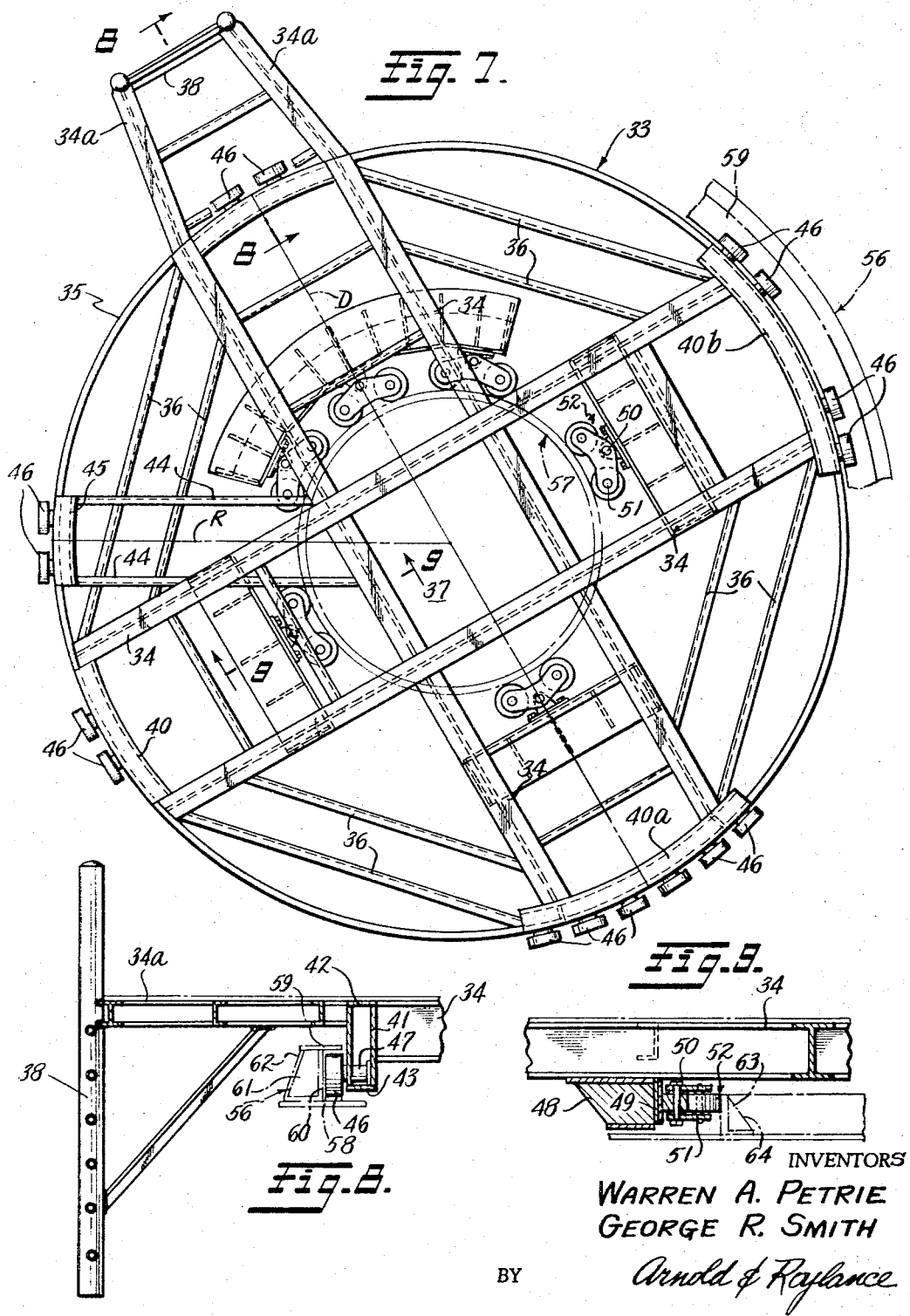

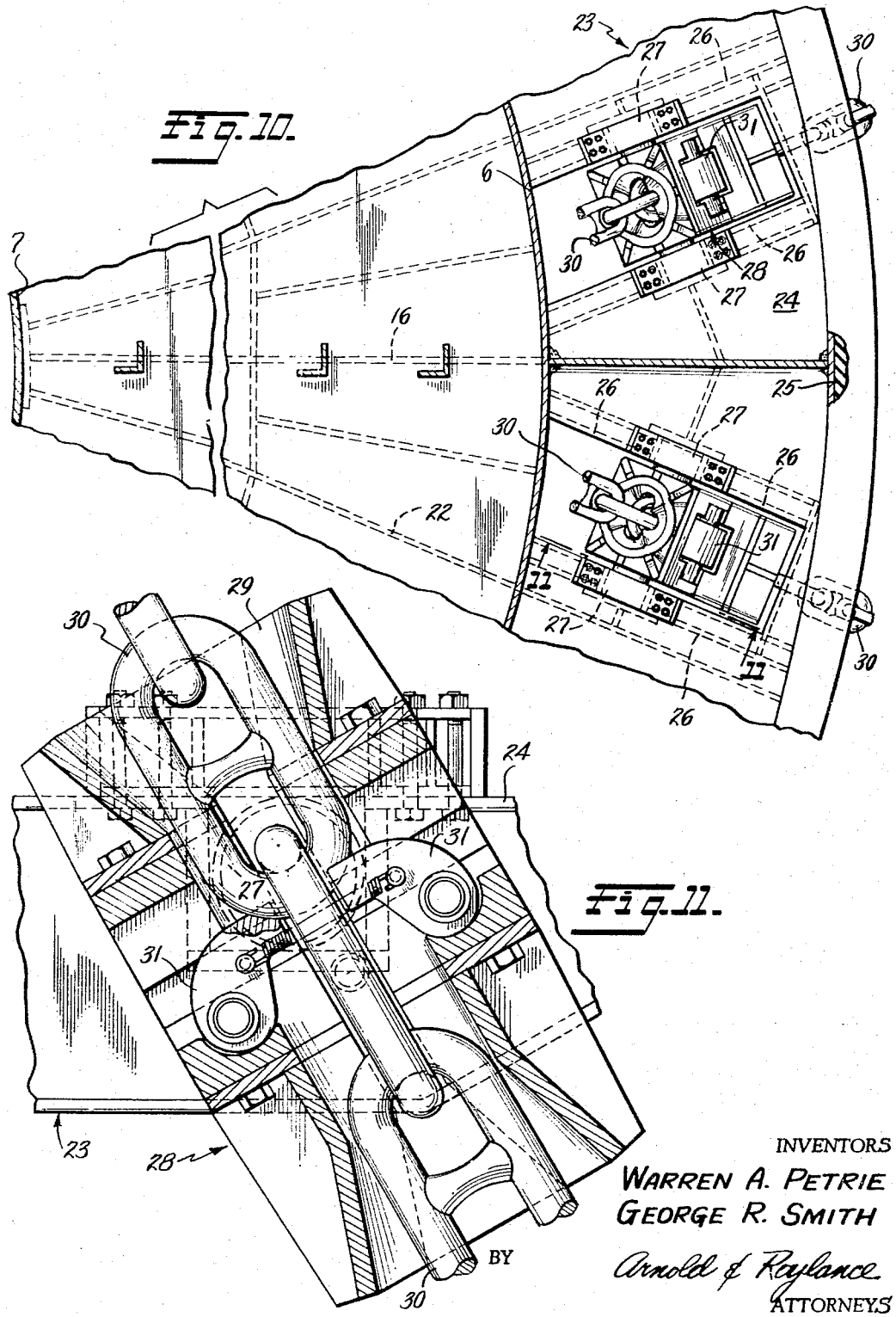

Jan. 30, 1968  W. A. PETRIE ET AL  3,365,734
BUOY FOR TRANSFERRING FLUENT MATERIALS
Filed Oct. 20, 1965  6 Sheets-Sheet 6
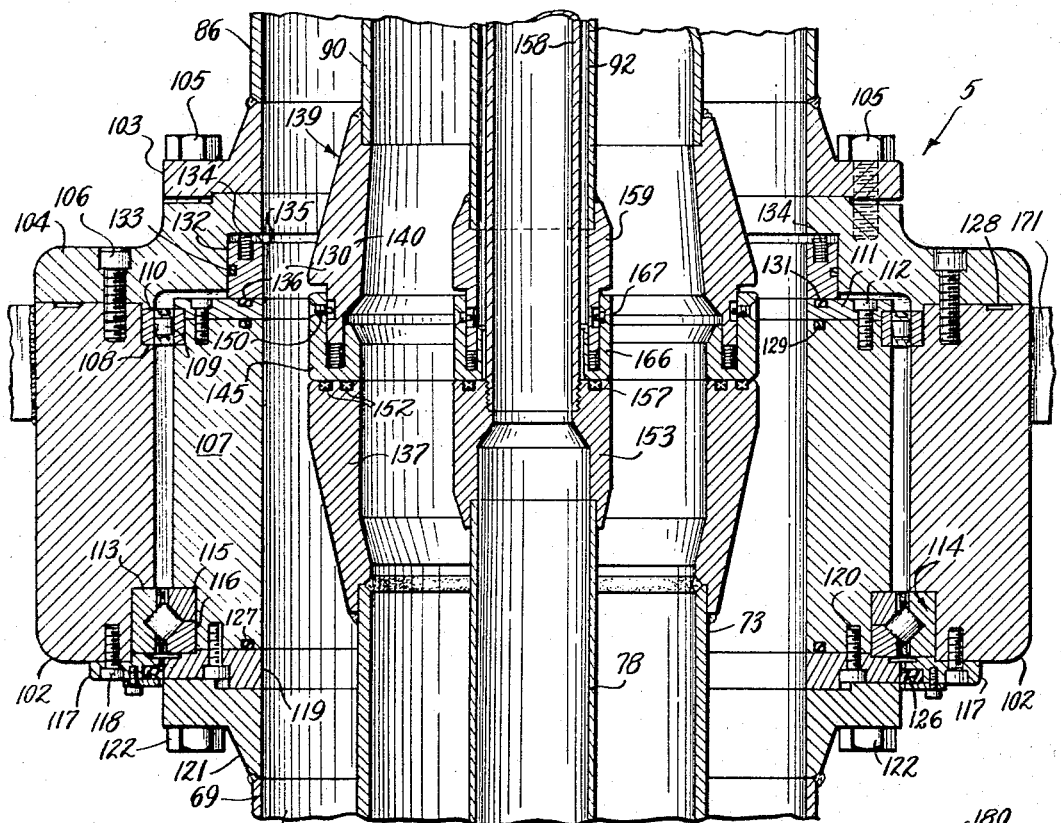
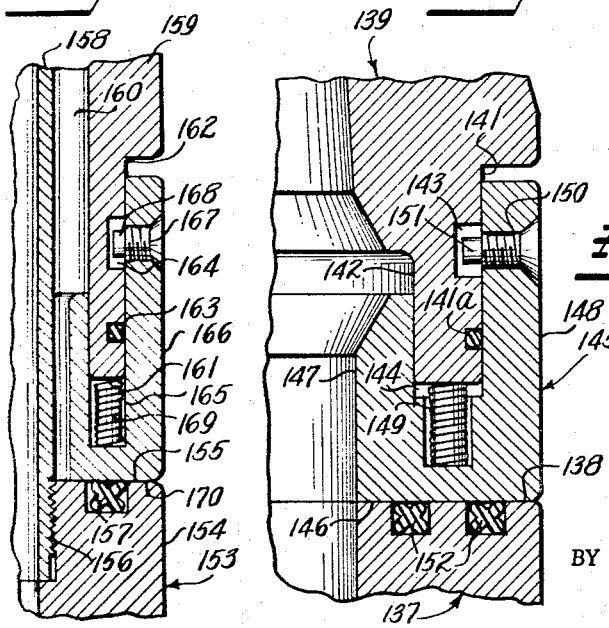
INVENTORS
WARREN A. PETRIE
GEORGE R. SMITH
BY Arnold & Roylance
ATTORNEYS United States Patent Office 3,365,734
Patented Jan. 30, 1968

3,365,734
BUOY FOR TRANSFERRING FLUENT
MATERIALS
Warren A. Petrie, New Orleans, and George R.
Smith, Covington, La., assignors to J. Ray Mc-
Dermott & Co., Inc., New Orleans, La., a cor-
poration of Delaware
Filed Oct. 20, 1965, Ser. No. 498,596
9 Claims. (Cl. 9—8)

ABSTRACT OF THE DISCLOSURE

A fluent material loading buoy of the type in which a conduit extending through a center opening of a buoyant base is attached by a swivel connection to a pipe supported by a support mounted on the base for rotation. The buoy includes an annular bumper structure projecting radially from the base and chain stoppers or other devices to secure anchor chains to the buoy are mounted on the bumper structure. The bumper structure projects radially in the plane of an intermediate horizontal wall of the buoy.

---

This invention relates to apparatus for use in transferring fluent materials to or from a marine vessel or the like, the precise location of which is not constant with respect to the transfer apparatus. The invention has particular application to buoys via which fluent materials are transferred to or from a vessel moored to the buoy, as in refueling or loading operations.

Prior-art workers have suggested numerous apparatus of this general type, particularly in the field of mooring buoys, but numerous problems have heretofore remained unsolved and such apparatus have as yet achieved only relatively limited success. Problems encountered in providing such apparatus stem in part from the difficulty of providing a stably anchored base or flotation structure which is capable of properly and conveniently supporting the necesasry conduiting, machinery and personnel.

The objects of this invention accordingly include provision of a transfer apparatus of the type described which is more stable when anchored and which serves the combined purposes of mooring and fluent material handling more effectively and dependably, over long periods of use, than have such devices in the past.

Another object is to provide a buoy structure which is moored by anchors and includes an improved arrangement by which the anchor chains are attached to the buoy to achieve unusual stability of the buoy.

A further object is to devise such a buoy structure including an improved rotary deck arrangement, with provision for mooring a vessel to the rotary deck structure in such fashion that the forces arising from such mooring are effectively transferred to the buoy with a minimum danger of structural failure.

Yet another object is to provide such a buoy which includes a flotation structure more effectively adapted to contain and support machinery and equipment.

In order that the manner in which these and other objects are attained in accordance with the invention can be understood in detail, one particularly advantageous embodiment thereof will be described with reference to the accompanying drawings, which form a part of this specification, and wherein:

FIG. 1 is a side elevational view of a mooring buoy in accordance with the invention;

FIG. 3 is a vertical sectional view taken on line 3—3, FIG. 2;

FIG. 4 is a top plan view of the buoy with the rotary deck thereof removed and some parts shown in transverse cross section;

FIG. 5 is an enlarged fragmentary top plan view of a portion of the outer track for the rotary deck;

FIG. 6 is a fragmentary vertical sectional view taken on line 6—6, FIG. 5;

FIG. 7 is a top plan view of the rotary deck;

FIG. 8 is a fragmentary vertical sectional view taken on line 8—8, FIG. 7;

FIG. 9 is a fragmentary vertical sectional view taken on line 9—9, FIG. 7;

FIG. 10 is an enlarged horizontal sectional view taken on line 10—10, FIG. 3;

FIG. 11 is an enlarged fragmentary vertical sectional view taken on line 11—11, FIG. 10;

FIG. 12 is an enlarged vertical sectional view taken through the central vertical axis of the buoy and illustrating a multiple conduit swivel assembly;

FIG. 13 is an enlarged fragmentary vertical sectional view showing a portion of the innermost conduit of the swivel assembly;

FIG. 14 is an enlarged fragmentary vertical sectional view showing a portion of the intermediate conduit of the swivel assembly;

FIG. 15 is an enlarged fragmentary vertical sectional view similar to FIG. 14 but showing the conduit portion on modified form; and FIGS. 16 and 17 are typical sectional views, enlarged as compared to FIG. 12 and each taken on a different radial plane, of an anti-friction bearing employed in the swivel assembly of FIG. 12.

Figure 2:
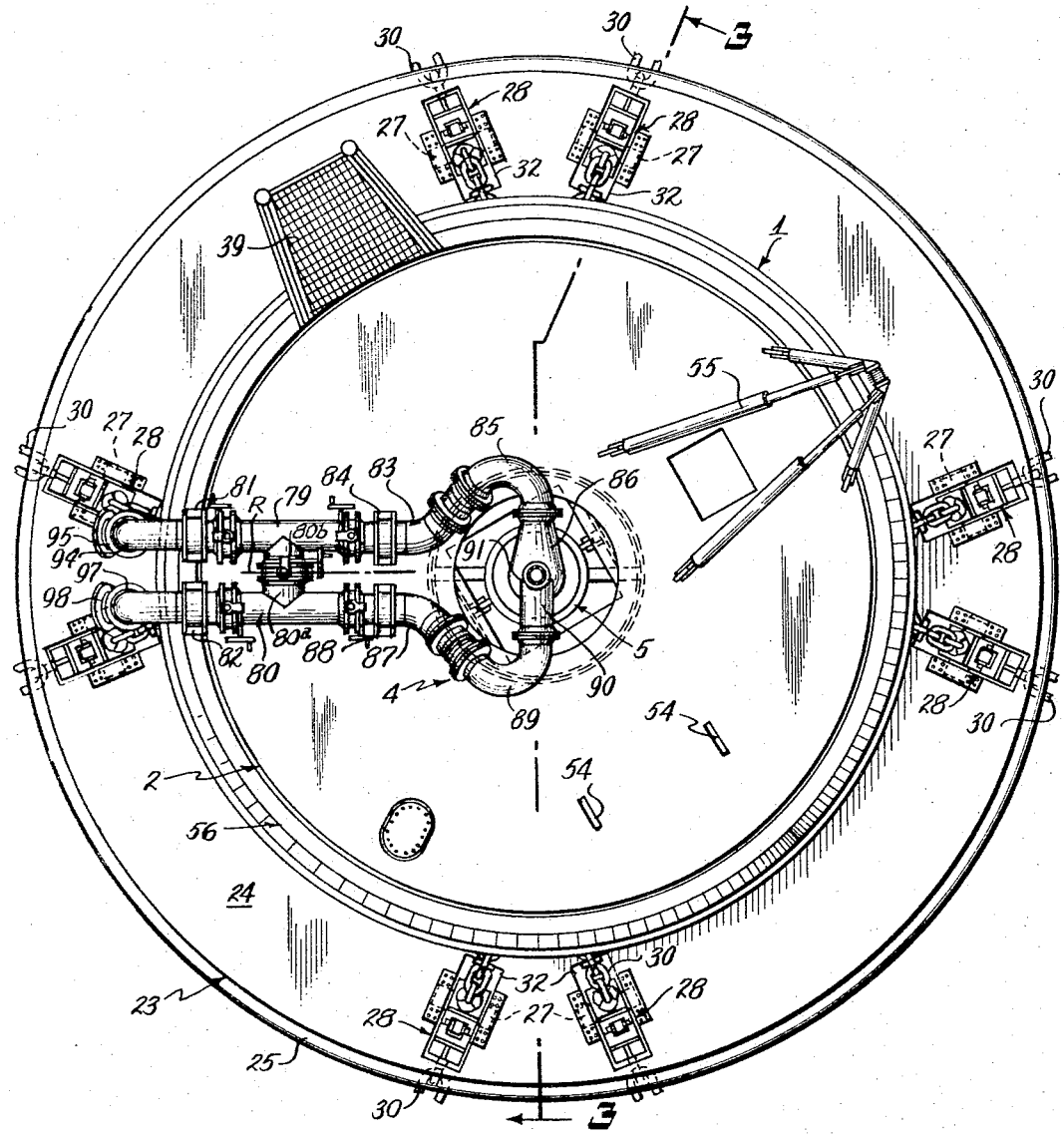
FIG. 2 is a top plan elevational view thereof.

Turning now to the drawings in detail, the embodiment of the invention illustrated is a buoy comprising a buoyant base or flotation structure illustrated generally at 1 and constituting the main body of the buoy, a rotary support structure 2 mounted on base 1, a lower flow conduit assembly 3, an upper flow conduit assembly 4, and a swivel coupling 5 interconnecting the two flow conduit assemblies.

Body 1 includes a cylindrical outer wall 6, a cylindrical inner wall 7, a flat annular bottom wall 8, and an annular top wall 9 including an outer portion 10 and an inner portion 11, the latter being spaced slightly below portion 10 and the two portions being joined by a short upright cylindrical portion 12. Inner wall 7 defines an upright through passage which opens through the top bottom walls and which is centrally disposed, walls 6 and 7 being concentric.

The interior of the annular space defined by walls 6–9 is divided by a flat transverse annular intermediate wall 13 into an upper chamber 14 and a lower chamber 15. Four radially extending vertical bulkheads 16 are provided, each including horizontal portions 17, 18 and 19 secured respectively to walls 8, 13 and 9. Bulkheads 16 also include vertical portions 20 and 21, secured respectively to walls 6 and 7. Portions 19 and 20 extend only for a limited distance inwardly, so that the space above intermediate wall 13 is open and uninterrupted, to accommodate suitable machinery (not shown) mounted on wall 13.

The bulkheads 16 are angularly spaced at 90° intervals. Adjacent each bulkhead 16, there is located a pair of horizontally extending beams 22, one on each side of the bulkhead, these beams diverging outwardly in such fashion that the bulkhead bisects the angle between the two beams. A transverse annular bumper structure 23 is secured to body 1 and projects outwardly therefrom, with the top wall member 24 of the bumper structure lying in the same transverse plane as does intermediate wall 13. A bumper ring 25 is suitably secured to the periphery of structure 23. At angularly spaced positions each centered on a different one of the bulkheads 16, bumper structure 23 includes generally outwardly extending frame members 26 arranged in pairs, the members of each such pair being equipped with upwardly opening notches accommodating the aligned trunnion bearings 27 of a pivoted chain stopper 28, one chain stopper being shown in detail in FIG. 11. There are thus a total of eight of the chain stoppers 28 arranged in pairs, the pairs being equally spaced from each other and with the chain stoppers of each pair being spaced apart by a relatively small angular distance centered on the corresponding bulkhead 16, as seen in FIG. 2. Disclosed in detail in our copending application Ser. No. 480,979, filed Aug. 19, 1965, now Patent No. 3,289,626, chain stoppers 28 each include a passage 29 accommodating an anchor chain 30, the chain being held against downward movement relative to the buoy by pawls 31. The free end portions of chains 30 emerge from the tops of the chain stoppers and dangle through openings 32 in the bumper structure 23 so as to be readily available for attachment to a wire line (not shown) extending to a derrick or the like for tightening of the chains. Each chain 30 extends downwardly to an anchor (not shown) and, when the buoy is installed, the anchors are positioned on the marine floor and equally spaced in a circle which is large in comparison with the circumference of the buoy so that, as seen in FIG. 3, the chains slant downwardly and away from the buoy. As shown in detail in FIG. 10, the chain stoppers of each pair diverge outwardly at an angle of 45°, which angle is bisected by the bulkhead 16. Thus, the forces applied to structure 1 by the anchor chains are concentrated at the bulkheads 16.

Support structure 2 is in the nature of a flat deck mounted wholly on flotation structure 1 for rotation about the central axis defined by the cylindrical inner wall 7 of structure 1. The support structure comprises a horizontal frame 33, FIG. 7, including two pairs of spaced, parallel main beams 34, a circular peripheral member 35, and braces 36 which extend between appropriate ones of beams 34 and generally chordwise of member 35. The two pairs of beams 34 extend at right angles to each other so as to define a square opening 37 at the center of the structure. One pair of beams 34 is extended beyond member 35, as seen at 34a in FIGS. 7 and 8, to support a dependent ladder 38 and a landing platform 39. At member 35, the beams 34 of each pair are interconnected by a rigid, arcuately extending cross beam 40 consisting of a portion of peripheral member 35, an inwardly spaced arcuate member 41, and flat top and bottom plates 42 and 43, respectively.

Each pair of main beams 34 is centered on a diameter D of the circle defined by peripheral member 35. While two of the cross beams are merely long enough to bridge the space between the corresponding ones of main beams 34, cross beams 40a and 40b are longer and project arcuately beyond the main beams which they interconnect. Cross beam 40a is located diametrically opposite landing platform 39, and cross beam 40b is located at an end of the other pair of main beams 34. A subsidiary pair of parallel beams 44 is provided, centered on radius R of the circle defined by member 35 and located near the ends of the respective beams 34 opposite cross beam 40b. The outer ends of beams 44 are interconnected by an arcuate cross beam 45 similar to cross beams 40.

Each of cross beams 40 and 45 support a plurality of dependent bogie wheels 46, FIGS. 7 and 8, each having a stub axle journalled in a bearing 47, FIG. 8, rigidly carried by member 35 and the respective one of members 41. The axis of rotation defined by each bearing 47 extends radially relative to the center of the circle defined by member 35, and parallel to the plane in which frame 33 lies. Wheels 46 are identical, and the axes of rotation for all of the wheels lie in a common plane spaced below frame 33. Cross beam 40a is equipped with six of the wheels 46, all equally spaced from each other. Cross beam 40b is equipped with two pairs of the wheels 46, with each pair approximately centered on the outer end of the corresponding one of main beams 34. The remaining cross beams 40, as well as cross beam 45, are each equipped with one pair of the wheels 46 and that pair is centered on the arcuate length of the respective cross beam.

At points spaced outwardly by a small distance from opening 37, a plurality of dependent bracket structures 48, FIG. 9, are secured rigidly to the bottom webs of main beams 34, bracket structures 48 being spaced in a circle centered on the center of opening 37. Each bracket 48 includes a vertical plate 49 which faces inwardly of structure 2. Secured rigidly to each plate 49 is a U-shaped bracket disposed with its legs projecting parallel to the frame 33 and inwardly toward opening 37. Each U-shaped bracket supports the vertical pivot pin 50 of a centralizing wheel unit indicated generally at 52 and including two wheels each mounted to rotate about a vertical axis 51, the two wheel axes being spaced equally from the pivot pin 50. All of the units 52 lie in a common plane so that the wheels thereof are also all disposed in a common plane parallel to frame 33.

As seen in FIGS. 2 and 3, structure 2 includes a flat deck plate 53 extending across and fixed to frame 33. At points diametrically opposite landing platform 39, two attaching devices 54, which can be conventional pad eyes, are provided as mooring points for vessels to or from which fluent materials are to be transferred via the buoy. Each device 54 is secured, through the deck plate, to a different one of the corresponding main beams 34. Accordingly, the mooring attachment points provided by devices 54 are not only directly connected to main beams of structure 2, which constitute portions of maximum strength, but also aligned radially with the larger group of bogie wheels 46 mounted on cross beam 40a. An A-frame hoist 55 is secured to structure 2, the legs of the A-frame being attached to the respective portions of main beams 34 which extend outwardly to cross beam 40b. Structure 2 is supported wholly on base structure 1 through engagement of bogie wheels 46 with an outer circular track 56 and engagement of wheel units 52 with an inner circular track 57. Track 56 includes a lower flat circularly extending plate 58 and an upper flat circularly extending plate 59, these two plates being interconnected by a vertical cylindrical web 60. Plate 58 is rigidly attached directly to the top of base structure 1. Web 60 is so located that plates 58 and 59 project both outwardly and inwardly therefrom. Generally, triangular braces 61 are secured to the outer face of web 60 and the outwardly projecting portions of plates 58 and 59. The entire track is surrounded by a frustoconical wall member 62 which forms an extension of outer wall 6. The inwardly projecting portions of plates 58 and 59, together with web 60, define a track of U-shaped transverse cross sections.

The diameter of web 60 is such that the web completely encloses the annular series of bogie wheels 46, with the web lying immediately adjacent to the bogie wheels. The locations of the bogie wheels 46 are such that, with structure 2 centered on the central axis of the passage defined by inner wall 7, all of the bogie wheels are disposed between plates 58 and 59. The diameter of each wheel 46 is substantially equal to the vertical space between plates 58 and 59 and, therefore, each bogie wheel is disposed in rolling contact with plate 58 and with plate 59.

The inner track 57 consists of a cylindrical member 63 concentric with the passage defined by inner wall 7, member 63 being rigidly secured to the top of base structure 1 and provided with suitable braces 64. Wheel units 52 are spaced along a circle of such diameter that each wheel thereof is disposed in rolling contact with the outwardly facing cylindrical track surface presented by member 63.

Since the bearings 47 are rigidly carried by cross braces 40, 45, so that the axes of rotation of wheels 46 are fixed relative frame 33, and since the plates 58, 59 of outer track 56 are rigidly fixed relative to base structure 1, engagement of wheels 46 between plates 58, 59 serves to secure supporting structure 2 to base structure 1 against any significant vertical movement. Since the axes of rotation of the wheels of units 52 are fixed relative to frame 33, and member 63 is rigidly secured to the base structure 1, engagement of the wheels of units 52 with member 63 serves to fix supporting structure 2 against movement transversely of the passage defined by inner wall member 7. However, rolling engagement of wheels 46 and the wheels of units 52 with their respective tracks allows free rotary movement of supporting structure 2 relative to base structure 1 about the axis of the passage defined by inner wall 7.

Lower flow conduit assembly 3 includes two parallel conduits 65 and 66, each connectable by submerged flow lines (not shown) to a source of fluent material or to a point to which fluent material is to be delivered. Conduits 65, 66 extend upwardly into the space surrounded by inner wall 7 of the base structure, the upper ends of the conduit being spaced a substantial distance below the top of the base structure. The upper end of conduit 65 is rigidly connected to the lower end portion 67 of a tubular member 68 having a vertical upper end portion 69 of substantially larger diameter than conduit 65. Upper end portion 69 is offset laterally from lower end portion 67, the two end portions being parallel. The intermediate portion 70 of member 68 is frustoconical, providing the taper necessary to accommodate the change in diameter between end portions 67, 69. The upper end of conduit 66 is rigidly connected to the lower end portion 71 of a second tubular member 72 which has an upper end portion 73 disposed concentrically within the upper end portion 67 of member 68. The intermediate portion 74 of member 72 extends through a suitable opening 75 in the wall of member 68, the two members being connected by a continuous weld joint which seals the edge of opening 75 to the wall of member 72 so that fluid cannot pass into or out of the annular space 76, FIG. 12, between the upper end portions 69 and 73 via opening 75.

The upper end portions 69 and 73 of the lower conduit assembly are rigidly connected to base structure 1 by radially extending vertical supporting plates 77, FIG. 3, which are joined, as by welding, both to inner wall 7 and to upper end portion 69. Accordingly, the lower conduit assembly 3 is suspended directly from the base structure 1.

Lower conduit assembly 3 further includes a smaller conduit 78 having its upper end portion disposed concentrically within the upper end portion 73 of member 72, conduit 78 extending downwardly and laterally through suitable openings in members 68 and 72, being welded to members 68, 72 at those openings, and then extending across the space within inner wall 7 and through a suitable opening in that wall so as to enter chamber 14, as seen in FIG. 3.

Upper flow conduit assembly 4 includes horizontally extending conduits 79 and 80 disposed above supporting structure 2 and rigidly supported thereon by mounting clamps 81 and 82, respectively. Conduits 79 and 80 are each aligned directly above a different one of the two subsidiary beams 44 of frame 33. Conduit 79 has its inner end connected to an elbow 83 supported on structure 2 by a mounting clamp 84, and the inner end of elbow 83 is connected to one end of a second elbow 85. The other end of elbow 85 is connected to the smaller end of a tapered tubular member 86 which has its larger end opening downwardly and disposed in coaxial vertical alignment with the top of upper end portion 69 of member 68 of the lower conduit assembly. As seen in FIG. 3, member 86 curves upwardly and outwardly in such fashion that its smaller end is directed horizontally and radially with respect to the passage defined by inner wall 7 of structure 1. The smaller end of member 86 is disposed significantly above the location of conduits 79 and 80, and elbows 83 and 85 are of such curvature as to provide a smooth transition, between the location of the top of member 86 and the location of conduit 79, suitable for fluid flow with minimum frictional losses. The inner end of conduit 80 is connected to an elbow 87 supported on structure 2 by a mounting clamp 88, the inner end of the elbow 87 being connected to one end of a second elbow 89. The combination of elbows 87 and 89 curves first away from elbow 83, then upwardly, and then inwardly toward member 86, defining a smooth flow path essentially identical to that defined by the combination of elbows 83 and 85 save that the two flow paths curve in opposite directions. Accordingly, the two flow paths just mentioned are essentially symmetrical with respect to a vertical plane containing the radius R.

The upper end of elbow 89 is connected to the upper end of a tubular member 90 which is of such curved configuration and so located that its upper end is aligned with but extends oppositely to the upper end of member 86, while its lower end, as seen in FIG. 12, extends downwardly in vertical alignment with the upper end portion 73 of member 72 and is disposed concentrically within the lower end of member 86. The intermediate portion of member 90 passes through a suitable opening 91 in member 86, the two members being rigidly joined by a continuous weld at the edge of opening 91. The inner end of upper conduit assembly 4 is completed by a smaller, straight conduit 92 which extends vertically through openings in the walls of tubular members 86 and 90, such openings being aligned on the vertical central axis of the passage defined by inner wall 7 of structure 1. Conduit 92 is rigidly secured to members 86 and 90 by means of continuous welds at the edges of the openings through which conduit 92 passes. Conduit 92 depends to a point adjacent the upper end of tubular member 72.

The outer end of conduit 79 is connected by an elbow 94 to a swivel coupling 95, to which a flexible hose 96 can be connected to run to the vessel moored to the buoy. Similarly, the outer end of conduit 80 is connected by elbow 97 to swivel coupling 98, for connection of conduit 80 to hose 99. Elbows 94 and 97 are supported rigidly on structure 2 by horizontally extending mounting clamps 100 and 101, respectively.

Swivel coupling 5 serves to provide a fully sealed connection between the respective conduits of assemblies 3 and 4 with full freedom for rotation of assembly 4 with supporting structure 2, and with provision for transfer of axial loads wholly within the swivel coupling. The coupling comprises an outer cylindrical ring 102, FIG. 12, rigidly secured to he lower end of member 86 by rings 103 and 104, rings 103 being welded to member 86 and secured to ring 104 by screws 105, and ring 104 being secured to ring 102 by screws 106. Disposed concentrically within ring 102 is a smaller cylindrical ring 107. At their upper ends, rings 102 and 107 are provided with annular recesses which accommodate respectively the outer and inner races of a roller bearing 108, the rollers 109 of bearing 108 being disposed with their axes parallel to the common axis of rings 102 and 107 so that the bearing accepts lateral loads between the two rings. Bearing 108 is retained by an annular shoulder 110 on ring 104 and a flat annular plate 111 secured to the upper end of ring 107 by screws 112.

At its lower end, ring 102 has a short portion of enlarged internal diameter to accommodate the outer race 113 of an X-type roller bearing 114. Ring 107 is similarly provided with a matching portion of decreased outer diameter which accommodates the two inner race rings 115 and 116 of bearing 114. Race 113 is secured in place by a ring 117 fixed to the bottom end of ring 102 by screws 118. The inner race rings 115 and 116 are secured in place by an annular plate 119 fixed to the lower end of ring 107 by screws 120. The combination of ring 107 and plate 119 is rigidly connected to the upper end 69 of tubular member 68 by a ring 121, that element being welded to member 68 and fixed to plate 119 and ring 107 by screws 122.

Outer race member 113 of bearing 114 has an inwardly opening groove of V-shaped transverse cross section, the lower wall 123 thereof constituting a downwardly and inwardly tapering frusto-conical surface supporting the rollers 124 of the bearing. The inner race rings 115, 116 are chamfered so that the race rings coact to provide a matching outwardly opening groove, the downwardly and inwardly slanting frusto-conical surface 125 thus provided on race ring 115 being parallel to wall 123 and spaced thereabove. As seen in FIGS. 16 and 17, some rollers 124 are arranged with their axes of rotation inclined upwardly and outwardly, so that the peripheries of these rollers engage the lower wall of the groove afforded by race 113. Others of the rollers 124 are oppositely inclined, with their peripheries engaging the inclined surface presented by race ring 116. With the race rings 113, 115 and 116 rigidly secured, rollers 124 serve to transfer both axial and lateral loads between rings 102 and 107.

Ring 117 is provided with a downwardly and inwardly opening annular notch which accommodates a lip type annular sealing element 126, the lip of sealing element 126 engaging the outer periphery of plate 119. An O-ring seal is provided at 127 between the flat lower end face of ring 107 and the top face of plate 119. Similarly, an O-ring seal is provided at 128 between the flat upper end face of ring 102 and the lower face of ring 104, and an O-ring seal is provided at 129 between the flat upper end face of ring 107 and the lower face of plate 111.

Rings 103 and 104 have central bores of the same diameter as the upper end portion of member 68 and the lower end portion of member 72. The lower end portion of the bore of ring 104 is enlarged, providing a cylindrical cavity to accommodate a cylindrical, floating seal member 130 which has a flat annular lower end face 131 and a cylindrical outer surface 132 which is closely embraced by the bore of ring 104 and is provided with an outwardly opening transverse annular groove accommodating an O-ring 133 to seal between member 130 and ring 104. The upper end of member 103 has a plurality of upwardly opening recesses in each of which is disposed a helical compression spring 134, the springs 134 acting against shoulder 135 to urge member 130 downwardly and bring end face 131 thereof into operative engagement with an O-ring 136 disposed in an upwardly opening groove in the upper end face of plate 111.

Welded to the upper end of member 72 is a tubular coupling member 137 of substantially greater wall thickness than member 72 and having a flat transverse annular end face 138. A tubular coupling member 139 is welded to the lower end of member 90. Member 139 tapers downwardly and outwardly, so as to include a body portion which, at 140, is of substantially the same wall thickness as the adjacent end portion of member 137. At its lower end, member 139 includes an annular skirt of reduced wall thickness, providing a cylindrical outer surface 141 which is of smaller outside diameter than the body portion of the member, and a cylindrical inner surface 142 of larger diameter than the inner surface of body portion. Surface 141 is interrupted by a plurality of outwardly opening notches 143. The skirt of member 139 extends downwardly into an upwardly opening annular groove 144 in a floating seal member 145 having a flat transverse annular bottom face 146, a cylindrical inner surface 147, and a cylindrical outer surface 148. The lower wall of groove 144 is provided with a plurality of recesses each accommodating a spring 149, the springs engaging the lower end face of the skirt of member 139 so as to bias seal member 145 downwardly. To retain member 145 on member 139 when the coupling is not fully assembled, screws 150 are engaged in suitable threaded radial bores, each screw having a tip 151 projecting inwardly into the respective one of notches 143. Near the lower end of the skirt, outer surface 141 is interrupted by a transverse annular outwardly opening groove accommodating an O-ring 141a to establish a fluid-tight seal between members 139 and 145. The upper end face 138 of member 137 is provided with two concentric annular grooves each accommodating a sealing ring 152 to be engaged by bottom face 146 of seal member 145.

The inner conduit 78 projects upwardly to a point within coupling member 137. Welded to the upper end of conduit 78 is a tubular coupling member 153 having a cylindrical outer surface 154, a flat annular top surface 155, and a central bore, the upper end portion 156 of the bore being threaded. Top surface 155 is provided with an annular groove accommodating a sealing ring 157. The combination of conduit 78 and coupling member 153 supports a straight vertical conduit 158 which has its lower end exteriorly threaded and engaged in threaded portion 156 of member 153. In the completed assembly, conduit 158 extends upwardly through the smaller conduit 92 of assembly 4, the upper end 158a of conduit 158 projecting above member 86.

A tubular coupling member 159 is welded to the lower end of conduit 92 and includes a dependent cylindrical skirt having an inner cylindrical surface 160, a transverse lower end surface 161, and a cylindrical outer surface 162, the latter surface being provided with a transverse annular groove, accommodating an O-ring 163, and a plurality of outwardly opening notches 164. The skirt of member 159 extends downwardly into an annular upwardly facing groove 165 in an annular floating seal member 166. The portion of member 166 defining the outer wall of groove 165 is provided with a plurality of radially directed threaded bores each accommodating a retaining screw 167. Screws 167 have tip portions 168 of a diameter substantially smaller than the height of notches 164, and the tip portions of the screws project respectively into notches 164 to retain seal member 166 on coupling member 159. The bottom wall of groove 165 is provided with upwardly opening recesses each accommodating a helical compression spring 169, the upper end of each spring 169 engaging lower end surface 161 so that the springs bias seal member 166 downwardly away from member 159. Seal member 159 has a flat annular bottom face 170 opposed to face 155 of member 153 and disposed to be sealingly engaged by ring 157.

Four equally spaced, radially projecting ears 171 are welded to the outer surface of ring 102 adjacent the top thereof. Four yoke members 172 are welded to the appropriate points on main beams 34, each yoke member 172 projecting inwardly and straddling a different one of the ears 171 to provide means for interconnecting ring 102 and support structure 2.

Since the combination of members 68, 72 and 78 is rigid, by reason of the welded connections between those members, the upper portions 69, 73 and the upper end portion of member 78, along with ring 107, are all constrained to mutually concentric positions centered on the axis of the through passage defined by wall 7. Similarly, members 86, 90 and 92, and ring 102 are all constrained to mutually concentric positions centered on that axis. Accordingly, with swivel joint 5 assembled as seen in FIGS. 12–14, faces 138 and 146 are in mutual sliding engagement, with a fluid-tight seal established therebetween by rings 152, and faces 155 and 170 are similarly engaged, with a fluid-tight seal established therebetween by ring 157. The interior of member 68 therefore is in communication with the interior of member 86, while the interior of member 72 communicates with the interior of member 90, and conduit 158 extends upwardly through and concentric with conduit 92. On the other hand, bearings 108 and 114, and the sliding engagement of faces 138, 146 and 155, 170, allow free rotary movement of the upper conduit assembly 4 relative to lower conduit assembly 3, with minimum friction and with no chance for contamination of the fluent material being handled.

In assembling the apparatus of FIGS. 1–14, the lower conduit assembly 3 is installed in base structure 1, being rigidly supported by members 77. Ring 121 is welded to tubular member 68 before the latter is installed. All other elements of swivel 5 which are disposed below ring 103 are assembled before the swivel is installed, and it is thus a relatively simple matter to lower the main swivel assembly into place and secure it by screws 122 and the yoke and pin connections at 171–173. Then, when the upper conduit assembly 4 is installed, it is only necessary to seat ring 103 on ring 104 and install screws 105. As the combination of members 86, 90 and 92 is lowered into position to secure ring 103 to 104, the lower face 146 automatically comes into its position of sliding engagement with face 138 and sealing rings 152, while face 170 similarly comes into engagement with face 155 and sealing ring 157.

In the moldified embodiment illustrated in FIG. 15, the upper ends of members 72 and 78 are each equipped with a tubular coupling member 175 having a body 176 of smaller internal diameter and an upper tip portion 177 of larger internal diameter, so that the tip presents a cylindrical inner surface 178. The lower ends of members 90 and 92 are each equipped with a tubular coupling member 179 having a body 180 of larger outer diameter and a tip portion 181 of smaller diameter, the latter presenting a cylindrical outer surface 182 capable of slidable engagement with surface 178. Tip portion 181 includes two axially spaced outwardly opening transverse annular grooves each accommodating a sealing ring 183. When this modified construction is employed, lowering of the appropriate upper conduit assembly members into place causes tip 181 to be inserted into tip 177, with surfaces 178 and 172 being in slidable engagement.

For greater flexibility in choice of flow paths, conduits 79 and 80, FIG. 2, are advantageously interconnected by a cross-conduit 80a equipped with a suitable valve 80b.

Though it is particularly advantageous to employ base structure 1 as the floating structure of a buoy, those skilled in the art will understand that base structure 1 can be a stationary structure, such as a portion of a dock or the like. Also, though the invention finds particular application to the handling of liquids, such as fuel oil, gasoline, etc., the apparatus can be employed to handle any fluent material, including air-conveyed streams of particulate solids, for example.

One particularly advantageous embodiment of the invention has been chosen for illustrative purposes, and it will be understood that various changes and modifications can be made therein without departing from the scope of the invention as defined in the appended claims.

What is claimed is:

1. In a buoy for transferring fluent materials to and from a vessel moored thereto, the combination of
   a buoyant base structure having a top, a bottom, and a centrally disposed upright through passage;
   a support structure disposed above the top of said base structure and having a central opening aligned above said passage;
   means mounting said support structure on said base structure for rotation about the central axis of said passage;
   lower flow conduit means extending upwardly within said through passage and having an upper end portion adjacent the top of said base structure;
   means rigidly securing said upper end portion of said lower conduit means to said base structure;
   upper flow conduit means disposed above said support structure and extending laterally of said passage, said upper flow conduit means being mounted on said support structure for rotation therewith and including an inner end portion directed downwardly in alignment with said upper end portion of said lower conduit means;
   swivel coupling means interconnecting said inner end portion of said upper conduit means and said upper end portion of said lower conduit means;
   attachment means on said support structure to which a mooring line from the vessel to be served can be secured;
   a plurality of chain stoppers each having a passage through which an anchor chain can be run and means for stopping downward withdrawal of a chain therethrough; and
   means projecting latterally from said base structure and supporting said chain stoppers each for pivotal movement about an axis in a plane at right angles to the central axis of said through passage,
      said chain stoppers being spaced in a circular series surrounding said base structure,
      all of said chain stoppers being spaced substantially above the bottom of said base structure,
      the axis of pivotal movement of each of said chain stoppers extending chordwise of a circle transverse to and centered on the central axis of said through passage.

2. A buoy according to claim 1, wherein
   said means projecting laterally from said base structure is an annular bumper structure,
   each of said chain stoppers being equipped with a pair of trunnion bearings aligned transversely of the chain stopper,
   said bumper structure having upright openings each accommodating a different one of said chain stoppers, and
   said trunnion bearings being supported on said bumper structure.

3. A buoy according to claim 1, wherein
   said base structure includes
      an outer annular wall,
      an inner annular wall, and
      a plurality of radially extending upright bulkheads secured to and extending between said inner and outer walls,
   said chain stoppers being grouped in pairs each centered on a different one of said bulkheads.

4. A buoy according to claim 1, wherein
   said base structure includes
      an outer annular wall,
      an inner annular wall,
      a transverse wall extending between said outer and inner walls, said transverse wall lying in a plane spaced a substantial distance above the bottom of said base structure and dividing the interior thereof into an upper and a lower compartment, and
      a plurality of radially extending upright bulkheads secured to said outer and inner walls and said transverse wall, and
   said means projecting laterally from said base structure and supporting said chain stoppers is an annular bumper structure surrounding said outer wall and lying is substantially the same plane as said transverse wall.

5. A buoy according to claim 1, wherein
   said support structure comprises a rigid frame including a peripheral portion spaced outwardly from said central opening, and
   said means mounting said support structure on said base structure comprises
      an outer circular track secured to the top of said base structure and having upper and lower track surfaces spaced apart in the direction in which said through passage extends,
      an inner circular track secured to the top of said base structure and having a cylindrical outwardly facing track surface, said outer and inner tracks being concentric and centered on the central axis of said through passage, a first set of wheels depending from the peripheral portion of said frame and mounted thereon for rotation about axes transverse to said through passage, the wheels of said first set being engaged between said upper and lower track surfaces of said outer track, and a second set of wheels depending from said frame adjacent said central opening and mounted on said frame for rotation about axes parallel to the central axis of said through passage, the wheels of said second set engaging said outwardly facing track surface of said inner track, said support structure being wholly supported on said base structure via said wheels and tracks.

6. A buoy according to claim 5, wherein said attachment means is located at a point spaced radially from the center of said frame, said frame includes a beam structure extending radially from the center of said frame and extending through the location of said attachment means, the wheels of said first set being circularly spaced in groups with one of said groups including a larger number of said wheels than do others of said groups, and said one group of wheels being centered on said beam structure and located outwardly from said attachment means.

7. A buoy according to claim 5, wherein said frame includes a plurality of pairs of parallel main beams with said pairs crossing each other near the center of said frame and with the beams of each pair being equally spaced from, and located each on a different side of, a line extending diametrically of said support structure.

8. A buoy according to claim 7, wherein said frame further comprises a plurality of cross beams each rigidly interconnecting the adjacent ends of a different one of said pairs of main beams, the wheels of said first set being mounted on said cross beams.

9. In a buoy for transferring fluent materials to and from a vessel moored thereto, the combination of an annular buoyant base structure comprising an annular outer wall, an annular inner wall spaced inwardly from said outer wall and defining an upright through passage, top and bottom walls, and an intermediate wall spaced substantially above said bottom wall and extending transversely of said through passage to divide the interior of said base structure into upper and lower compartments;

rigid bumper means projecting outwardly from said outer wall and disposed at least generally in the plane of said intermediate wall;

a plurality of chain stoppers mounted on said rigid bumper means and operative to secure anchor chains to said base structure at a plurality of circularly spaced points all lying at least substantially in the plane of said transverse wall said chain stoppers each having a passage through which an anchor chain can be run and means for stopping downward withdrawal of said anchor chain;

a support structure mounted wholly on the top of said base structure for rotation about the central axis of said through passage;

a lower flow conduit assembly extending upwardly within said through passage and having an upper end portion rigidly secured to said base structure adjacent the top thereof;

an upper flow conduit assembly disposed above said support structure and mounted thereon, said upper conduit assembly extending laterally of said through passage and having a downwardly directed inner end portion aligned above said upper end portion of said lower conduit assembly; and swivel coupling means connecting said inner end portion of said upper conduit assembly to said upper end portion of said lower conduit assembly.

References Cited

UNITED STATES PATENTS

| | | | |
|---|---|---|---|
| 13,760 | 11/1855 | Perley | 114—200 |
| 138,292 | 4/1873 | Stoner | 9—8 |
| 2,771,617 | 11/1956 | Brackx | 9—8 |
| 3,082,440 | 3/1963 | Rhedin | 9—8 |
| 3,187,355 | 6/1965 | Wessenaar | 9—8 |

FERGUS S. MIDDLETON, *Primary Examiner.*

MILTON BUCHLER, *Examiner.*

T. MAJOR, *Assistant Examiner.*